United States Patent Office 3,035,082
Patented May 15, 1962

3,035,082
DISULFIDES OF THE PHOSPHORIC, PHOSPHONIC AND PHOSPHINIC ACID SERIES AND PROCESS FOR THE PRODUCTION THEREOF
Walter Lorenz, Wuppertal-Vohwinkel, Germany, assignor to Farbenfabriken Bayer Aktiengesellschaft, Leverkusen, Germany, a corporation of Germany
No Drawing. Filed Feb. 9, 1961, Ser. No. 88,027
Claims priority, application Germany Feb. 12, 1960
10 Claims. (Cl. 260—461)

The present invention relates to and has as its objects new and useful insecticidally active phosphorus derivatives and a new and interesting process for producing same. Generally the inventive compounds of the present invention may be represented by the general formula

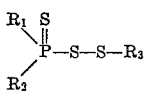

wherein $R_1$ and $R_2$ stand broadly for hydrocarbon radicals which also may be attached to the phosphorus atom by means of a hetero atom such as oxygen, sulfur or nitrogen; and $R_3$ stands for a substituted mercapto alkyl radical, a possibly substituted aliphatic radical or an alkyl radical substituted by an amino carbonyl group or alkoxy carbonyl group.

Until now, the above type of organic phosphorus compounds could be obtained by allowing aliphatic, aromatic, or hydroaromatic sulfenic acid chlorides to act upon O.O-dialkylthiol- or -thiono-thiol-phosphoric acids or upon O-alkyl-thiolphosphonic or -thiono-thiolphosphonic acids:

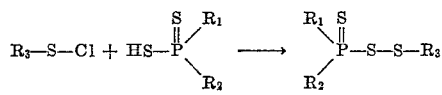

Known are such compounds of the preceding formulae only if $R_3$ is an unsubstituted alkyl or aryl group.

In accordance with the present invention it has now been discovered that disulfides of the phosphoric or phosphinic or phosphonic acid series can be prepared by reacting salts of thiosulfonic acid monoesters with thiono-thiolphosphoric acid - diesters, thiono - thiolphosphonic acid-monoesters, their corresponding S- or N-analogues, or thiono-thiolphosphinic acids. The following equation should explain this reaction:

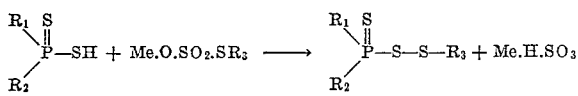

In these formulae, $R_1$ and $R_2$ more specifically denote alkoxy groups, alkyl, or aryl groups, wherein $R_1$ and $R_2$ may be the same or different, $R_3$ represents the groups said at the beginning, and Me is a monovalent metal radical, particularly an alkali metal. The reaction proceeds especially readily in an aqueous or alcoholic or acetone medium at 20–60° C.

This reaction is surprising since it is known that during the action of acids on compounds known as "Bunte-salts" mercaptans are formed by the decomposition of the sodium alkylthiosulfate, e.g. aralkyl mercaptans, and in particular benzyl-mercaptan from sodium benzylthiosulfate on acid hydrolysis; of U.S. Patent 1,729,615.

It is known already that unsymmetrical disulfides can be obtained in very good yields when "Bunte-salts" are reacted with sodium mercaptides (H. B. Footner and S. Smiles, J. Chem. Soc. 127, 2887 (1925)). The process according to the present invention, however, differs from this method for the preparation of unsymmetrical disulfides since when acid-binding agents are employed, the reaction shown by the following scheme

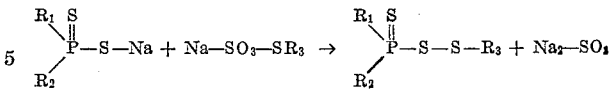

does not occur at all. To start the reaction according to this invention, the free thiono-thiolphosphoric or -phosphonic or -phosphinic acids must be used.

This novel process is also a valuable addition to chemical processes known from the literature. The preparation of the corresponding mercaptans is not necessary; this way starts from corresponding halides, which usually are easily obtainable, and via "Bunte-salts" the above shown products are formed. By this method compounds can be prepared which could not be obtained as yet by standard procedure.

The novel compounds of this invention are colorless to light yellow oils insoluble in water which are already pure without distillation. The esters obtainable in accordance with this invention have insecticidal activity at low toxicity towards warm-blooded animals. In addition they are valuable intermediate products for other phosphoric acid esters. Moreover, they can be applied as flame proofing agents, flotation agents, or additives for lubricating oils.

As an example for the special utility of the inventive compounds the compound of the following formula

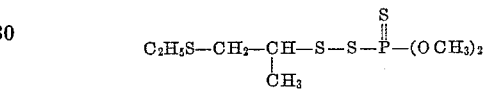

has been tested against aphids and spider mites. Aqueous solutions of the aforementioned compound have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration. The tests have been carried out as follows:

(a) Against aphids (contact-insecticidal action) of the type Doralis fabae. Heavily infested bean plants (Vicia faba) have been sprayed drip wet with solutions as prepared above. The effect has been determined by evaluation after 24 hours by counting the dead pests either on the surface of the soil or still remaining on the plants. Complete killing is obtained with 0.1% solutions.

(b) Against spider mites (contact-insecticidal action). Bean plants (Phaseolus vulgaris) of about 15 inches height are sprayed drip wet with solutions prepared as indicated above. The bean plants have been infested heavily with the two-spotted spider (species Tetranychus telarius). Evaluation has been carried out after 24 hours, 48 hours and 8 days. Complete killing has been obtained with 0.01% solutions.

The following examples are given for the purpose of illustrating the invention.

*Example 1*

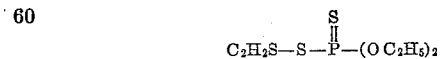

66 grams (0.4 mol) of the sodium salt of ethyl-thiosulfate are dissolved in 150 cc. of water. 58 grams (0.3 mol) of diethyl-dithiophosphoric acid (95%) are added dropwise and the mixture is stirred overnight at room temperature. After a short while, the solution turns yellow and sulfur dioxide is evolved. The oil is taken up in petroleum ether, neutralized with sodium bicarbonate solution, and washed with water until neutral. After drying over sodium sulfate and distilling the solvent off, the ester boils at 62° C./0.01 mm. Hg in the form of a pale yellow oil. Yield 60 grams (81% of the theoretical).

Molecular weight=246.3.
Calculated: S, 39.05; P, 12.58.
Found: S, 39.35; P, 12.52.

Toxicity on rats per os $LD_{50}$ amounts to 750–1000 mg./kg. Flies are killed completely with 0.01% solutions.

*Example 2*

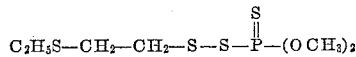

56 grams (0.25 mol) of sodium 2-ethylmercapto-ethyl-thiosulfonate (the salt cannot be stored) are dissolved in 150 cc. of water. After 42 grams (0.25 mol) of di-methyl-dithiophosphoric acid (95%) are added dropwise, the mixture is stirred at room temperature for 2–3 hours. The solution thereupon turns yellow. After adding 150 cc. of water, it is neutralized with dilute potassium carbonate solution, whereupon the color changes to colorless. The residual oil is taken up in petroleum ether. It is washed with water, dried over sodium sulfate, and the solvent distilled off. 25 grams of the ester remain as a pale yellow oil; $n_D^{24}$ 1.5772. Yield 36% of the theoretical.

Molecular weight=278.4.
Calculated: S, 46.06; P, 11.13.
Found: S, 46.07; P, 11.23.

$LD_{95}$ on rats per os amounts to 500 mg./kg. Flies are killed completely with 0.0001% solutions and systemic action with 0.1% solutions is 100%.

By the same way there may be obtained the compound of the following formula $$CH_3S-CH_2-CH_2-S-S-\overset{\overset{S}{\|}}{P}-(OCH_3)_2$$

*Example 3*

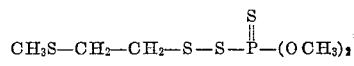

45 grams (0.2 mol) of sodium 2-ethylmercapto-ethyl-thiosulfonate are dissolved in 150 cc. of water, and after dropwise addition of 39 grams (0.2 mol) of diethyl-dithiophosphoric acid, the mixture is stirred for 2–3 hours; another 100 cc. of water are then added, the whole neutralized with dilute potassium carbonate solution, and the oil taken up in petroleum ether. After washing with water, drying over sodium sulfate, and distilling the solvent off, a pale yellow oil of B.P. 96–98° C./0.01 mm. Hg, $n_D^{20}$ 1.5635 is obtained. Yield 32 grams (50% of the theoretical).

Molecular weight=306.5.
Calculated: S, 41.84; P, 10.11.
Found: S, 41.86; P, 10.30.

The toxicity on rats per os $LD_{50}$ amounts to 100 mg./kg. Aphids are killed completely with 0.1% solutions. Mosquito larvae are killed to 100% with 0.001% solutions.

*Example 4*

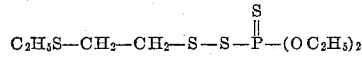

94 grams (0.4 mol) of non-recrystallized sodium 2-ethylmercapto-isopropyl-thiosulfonate are dissolved in 400 cc. of water. After addition of 66 grams (0.4 mol) of dimethyl-dithiophosphoric acid (95%) the mixture is warmed to 40–50° C. for 1 hour, neutralized with dilute potassium carbonate solution, and the oil taken up in petroleum ether. It is washed with water, dried over sodium sulfate, and the solvent distilled off. 25 grams of ester remain as a pale yellow oil. Yield 21% of the theoretical.

Molecular weight=294.4.
Calculated: S, 43.86; P, 10.60.
Found: S, 43.02; P, 10.09.

Aphids are killed completely with 0.1% solutions and spider mites are killed completely with 0.01% solutions.

*Example 5*

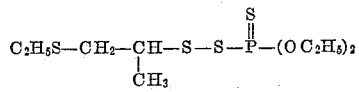

94 grams (0.4 mol) of non-recrystallized sodium 2-ethylmercapto-isopropyl-thiosulfonate are dissolved in 400 cc. of water. 75 grams (0.4 mol) of diethyl-dithiophosphoric acid (95%) are then added dropwise, and the mixture warmed to 40–50° C. for 1 hour. After cooling, the product is neutralized with dilute potassium carbonate solution. The remaining oil is taken up in petroleum ether, washed with water, dried with sodium sulfate, and distilled. B.P. 96° C./0.01 mm. Hg. Pale yellow oil. Yield 40 grams (34% of the theoretical).

Molecular weight=320.5.
Calculated: S, 40.02; P, 9.65.
Found: S, 40.39; P, 9.75.

$LD_{50}$ on rats per os amounts to 1000 mg./kg. Aphids are killed completely with 0.1% solutions and spider mites are killed to 90% with 0.01% solutions. The compounds have an ovicidal activity on the eggs of the red spider.

*Example 6*

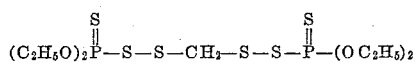

496 grams (2 mol) of sodium thiosulfate are dissolved in 500 cc. of water. A solution of 174 grams (1 mol) of methylene bromide in 700 cc. of ethyl alcohol are added dropwise to it. The mixture is heated under reflux overnight on a water bath, and the solvent is almost entirely distilled off from a water bath heated to 70° C. The glass-like residue is taken up in 500 cc. of water, and 195 grams (1 mol) of diethyl-dithiophosphoric acid are added dropwise with stirring. The mixture is stirred at room temperature for a further 12 hours, neutralized with dilute potassium carbonate solution, and the oil taken up in petroleum ether. The product is washed with water, and dried over sodium sulfate. After slight first runnings, the ester boils at 120–126° C./0.01 mm. Hg. Viscous, light yellow oil. Yield 45 grams (20% of the theoretical).

Molecular weight=448.6.
Calculated: S, 42.88; P, 13.81.
Found: S, 43.11; P, 14.08.

$LD_{50}$ on rats per os amounts to 250 mg./kg. Larvae of flies are killed completely with 0.1% solutions.

*Example 7*

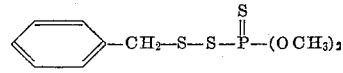

68 grams (0.3 mol) of sodium benzyl-thiosulfonate are dissolved in 200 cc. of water and warmed to 50–60° C. for 1 hour, whilst stirring, with 50 grams (0.3 mol) of dimethyl-dithiophosphoric acid. After cooling, the oil is taken up in benzene. It is washed with sodium bicarbonate solution until neutral, and finally again with water. It is dried over sodium sulfate, and the solvent is distilled off. 50 grams of the ester remain as a light yellow oil. Yield 59.5% of the theoretical.

Molecular weight=280.4.
Calculated: S, 34.30; P, 11.05.
Found: S, 34.50; P, 11.10.

The ester did not cause symptoms when administered per os to rats at 1000 mg./kg. Mosquito larvae were killed completely with 0.001% solutions.

*Example 8*

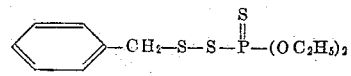

68 grams (0.3 mol) of sodium benzyl-thiosulfonate are dissolved in 200 cc. of water, and stirred overnight at room temperature with 58 grams (0.3 mol) of diethyl-dithiophosphoric acid (95%). The oil is taken up in petroleum ether, and washed till free from acid. It is dried over sodium sulfate, the solvent distilled off, and 60 grams of the ester are obtained as a thinly liquid light yellow oil. Yield 65.2% of the theoretical.

Molecular weight=308.4.
Calculated: S, 31.19; P, 10.05.
Found: S, 30.96; P, 9.99.
1000 mg./kg. on rats per os still proved to be without symptoms.

*Example 9*

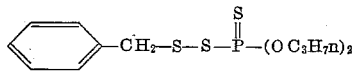

68 grams (0.3 mol) of sodium benzyl-thiosulfonate are dissolved in 200 cc. of water. After addition of 65 grams (0.3 mol) of di-n-propyl-dithiophosphoric acid, the mixture is warmed for one hour to 50–60° C. After cooling, the oil is taken up in ether, washed until neutral, dried, and freed from solvent. Thus, 65 grams of the ester are obtained as a light yellow oil. Yield 59% of the theoretical.

Molecular weight=336.5.
Calculated: S, 28.58; P, 9.21.
Found: S, 28.84; P, 9.64.
The ester is tolerated by rats per os at 1000 mg./kg. without symptoms.

The diisopropyl ester

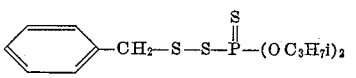

was prepared by a similar method. Yield 68 grams (62% of the theoretical) of a light yellow oil. 1000 mg./kg. of the ester on rats per os did not give any indications.

*Example 10*

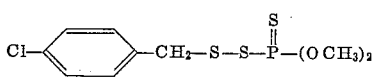

79 grams (0.3 mol) of sodium 4-chlorobenzyl-thiosulfonate in 200 cc. of water are warmed to 50–60° C. for one hour with 50 grams (0.3 mol) of dimethyl-dithiophosphoric acid. After cooling, the oil is taken up in ether and washed with sodium bicarbonate solution until neutral. It is dried over sodium sulfate, and after distilling off the solvent, 80 grams of the novel ester are obtained as a light yellow oil. Yield 72% of the theoretical.

Molecular weight=370.9.
Calculated: Cl 9.56; P, 8.35; S, 25.92.
Found: Cl, 8.70; P, 8.97; S, 25.44.
Rats tolerated 1000 mg./kg. per os without symptoms. Mosquito larvae were killed completely with 0.001% solutions.

*Example 11*

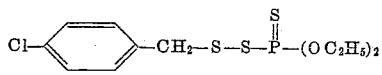

79 grams (0.3 mol) of sodium 4-chlorobenzyl-thiosulfonate and 58 grams (0.3 mol) of diethyl-dithiophosphoric acid (95%) are warmed to 50–60° C. for 60 minutes in 200 cc. of water. After cooling, the mixture is filtered by suction from impurities, and the oil is taken up in petroleum ether. After neutralizing with sodium bicarbonate, the solvent is dried with sodium sulfate and distilled off. 80 grams of a light yellow oil with B.P. 130° C./0.01 mm. Hg remain as residue. Yield 78.5% of the theoretical.

Molecular weight=342.9.
Calculated: Cl, 10.11; S, 28.05; P, 9.04.
Found: Cl, 10.29; S, 28.53; P, 8.98.

Toxicity of the ester on rats per os LD$_{50}$ amounts to 500 mg./kg.

*Example 12*

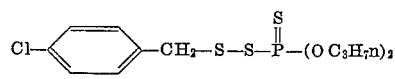

79 grams (0.3 mol) of the sodium 4-chlorobenzyl-thiosulfonate acid and 65 grams (0.3 mol) of di-n-propyl-dithiophosphoric acid are warmed to 50–60° C. for one hour in 200 cc. of water. After cooling, about 150 cc. of water are added, the oil is taken up in petroleum ether, washed until free from acid, dried over sodium sulfate, and the solvent is distilled off. Greenish yellow oil. Yield 82 grams=74% of the theoretical.

Molecular weight=370.9.
Calculated: Cl, 9.56; S, 25.94; P, 8.35.
Found: Cl, 9.42; S, 25.44; P, 8.21.
1000 mg./kg. of the ester were tolerated by the rat per os without symptoms. Systemic action with 0.1% solutions 100%.

The diisopropyl ester is prepared by a corresponding method. Greenish yellow oil. Yield 67.8% of the theoretical.

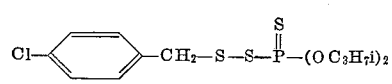

Molecular weight=370.9.
Calculated: Cl, 9.56; P, 8.35; S, 25.92.
Found: Cl, 9.11; P, 8.75; S, 25.28.
1000 mg./kg. of the ester per os on rats do not give any indication.

By the same way there may be obtained the compound of the following formula

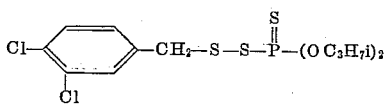

*Example 13*

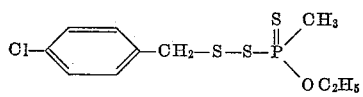

79 grams (0.3 mol) of sodium 4-chlorobenzyl-thiosulfonate and 47 grams (0.3 mol) of ethyl methyl-thionophosphonate are dissolved in 200 cc. of water, and warmed to 50–60° C. for one hour. After cooling, the resulting oil is dissolved in ether. After washing with sodium bicarbonate solution, it is dried over sodium sulfate and the solvent distilled off. 56 grams of a light yellow oil remain. Yield 59.5% of the theoretical.

Molecular weight=312.8.
Calculated: Cl, 11.34; S, 30.75; P, 9.90.
Found: Cl, 11.50; S, 30.66; P, 9.84.
1000 mg./kg. of the ester on the rat per os do not give any indication.

By the same way there may be obtained the compounds of the following formulae:

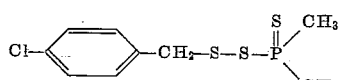

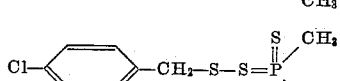

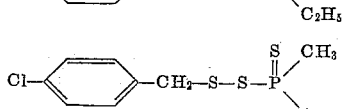

*Example 14*

The following esters were obtained from sodium 2-chlorobenzyl-thiosulfonate and the corresponding dialkyl-dithiophosphoric acids, as is described in Examples 10–13:

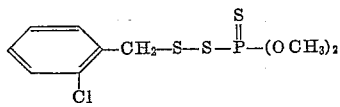

LD$_{50}$ on rats per os 1000 mg./kg.

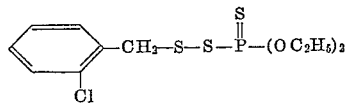

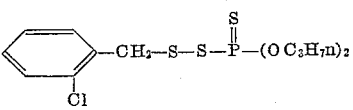

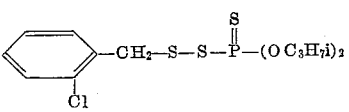

1000 mg./kg. of these esters on rats per os do not give any indications.

*Example 15*

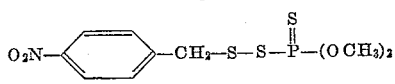

81 grams (0.3 mol) of sodium 4-nitrobenzyl-thiosulfonate are dissolved in 300 cc. of water and warmed to 50–60° C. for one hour with 50 grams (0.3 mol) of dimethyl-dithiophosphoric acid (95%). After cooling, the yellow oil is taken up in benzene, washed until free from acid, dried and freed from solvent. 50 grams of a yellow oil remain. Yield 51.4%.

Molecular weight=325.4.
Calculated: N, 4.31; S, 29.57; P, 9.52.
Found: N, 4.34; S, 29.64; P, 9.42.

1000 mg./kg. of the ester are tolerated by the rat per os without symptoms.

*Example 16*

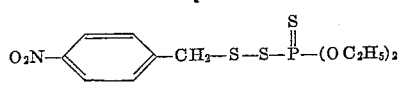

81 grams (0.3 mol) of the sodium salt of 4-nitrobenzyl-thiosulfonic acid and 58 grams (0.3 mol) of diethyl-dithiophosphoric acid are warmed to 50–60° C. for one hour in 300 cc. of water. After cooling, the oil is taken up in benzene, washed until free from acid, and dried over sodium sulfate. After distilling off the solvent, the ester is obtained as a light yellow oil. Yield 79 grams=74.6% of the theoretical.

Molecular weight=353.4.
Calculated: N, 3.96; S, 27.22; P, 8.77.
Found: N, 4.05; S, 27.27; P, 8.87.

LD$_{50}$ for the ester on rats per os amounts to 1000 mg./kg.

*Example 17*

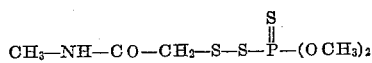

65 grams (0.3 mol) of the sodium salt of thiosulfonic-acetic acid-methylamide (M.P. 100–102° C.) are dissolved in 200 cc. of water, and treated with 50 grams (0.3 mol) of dimethyl-dithiophosphoric acid (95%). The mixture is stirred overnight at room temperature. After a short while, the reaction product turns yellow and sulfur dioxide is evolved. The resulting oil is dissolved in benzene and washed with sodium bicarbonate solution until neutral. After drying the benzene solution over sodium sulfate and distilling off the solvent, 20 grams of the above mentioned ester are obtained as a lemon-yellow oil which is not distillable. Yield: 25.6% of the theoretical.

By the same way there may be obtained the compound of the following formula

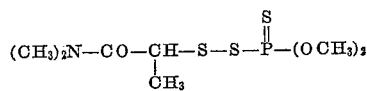

*Example 18*

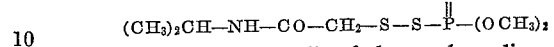

41.5 grams (0.175 mol) of the crude sodium salt of thiosulfonic acid-acetic acid-isopropylamide (M.P. 95° C.) are dissolved in 100 cc. of water. 29 grams (0.175 mol) of dimethyl-dithiophosphoric acid (95%) are added dropwise to this solution, and the mixture stirred overnight at room temperature. It is filtered off by suction from some precipitated sulfur and the oil taken up in benzene. The benzene solution is washed with sodium bicarbonate solution until neutral, dried over sodium sulfate, and the solvent is distilled off. 12 grams of the above ester remain as residue in the form of a lemon-yellow oil which cannot be distilled. Yield: 23.8% of the theoretical.

*Example 19*

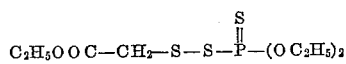

51 grams (0.25 mol) of the sodium salt of glycollic acid-ethyl ester-thiosulfate are dissolved in 150 cc. of water. 45 grams (0.24 mol) of diethyl-dithiophosphoric acid are added dropwise at 50–60° C. to the resulting solution and the mixture maintained at this temperature for another hour; after cooling the resulting yellow oil is taken up in petroleum ether, washed with sodium bicarbonate solution until neutral, dried over sodium sulfate, and distilled. B.P. 88° C./0.01 mm. Hg. Light yellow oil. Yield: 32 grams, corresponding to 43% of the theoretical.

*Analysis.*—Calculated for molecular weight 272.3: S, 30.59%; P, 9.85%. Found: S, 30.84%; P, 9.45%.

By the same way there may be obtained the compound of the following formula

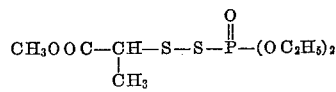

I claim:
1. A dithiophosphate of the general formula

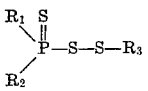

wherein R$_1$ and R$_2$ stand for members selected from the group consisting of alkyl radicals up to 4 carbon atoms and alkoxy radicals with the same number of carbon atoms, and in which R$_3$ stands for a member selected from the group consisting of a lower alkylmercapto-substituted lower alkyl radical, a phenyl-substituted lower alkyl radical, a chloro-substituted phenyl lower alkyl radical, a lower alkyl-amino-carbonyl-substituted lower alkyl radical, a lower alkoxy-substituted lower alkyl radical and a lower alkyl radical substituted by another

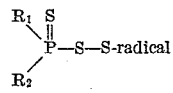

lower alkyl being in each case a group up to 4 carbon atoms.

2. The compound of the following formula

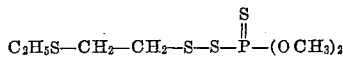

3. The compound of the following formula

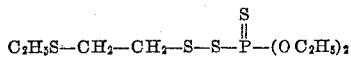

4. The compound of the following formula

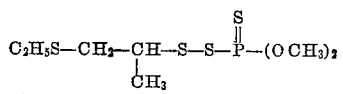

5. The compound of the following formula

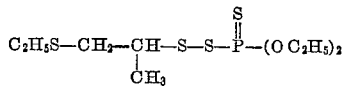

6. The compound of the following formula

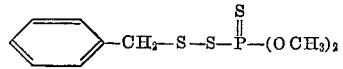

7. The compound of the following formula

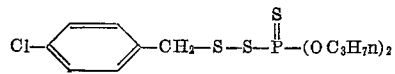

8. A compound of claim 1 wherein $R_1$ and $R_2$ are each alkoxy radicals having up to 4 carbon atoms and $R_3$ is lower alkyl mercapto-substituted lower alkyl.

9. A compound of claim 1 wherein $R_1$ and $R_2$ are each alkoxy radicals having up to 4 carbon atoms and $R_3$ is phenyl-substituted lower alkyl.

10. A compound of claim 1 wherein $R_1$ and $R_2$ are alkoxy radicals having up to 4 carbon atoms and $R_3$ is chloro-substituted phenyl lower alkyl.

No references cited.